UNITED STATES PATENT OFFICE.

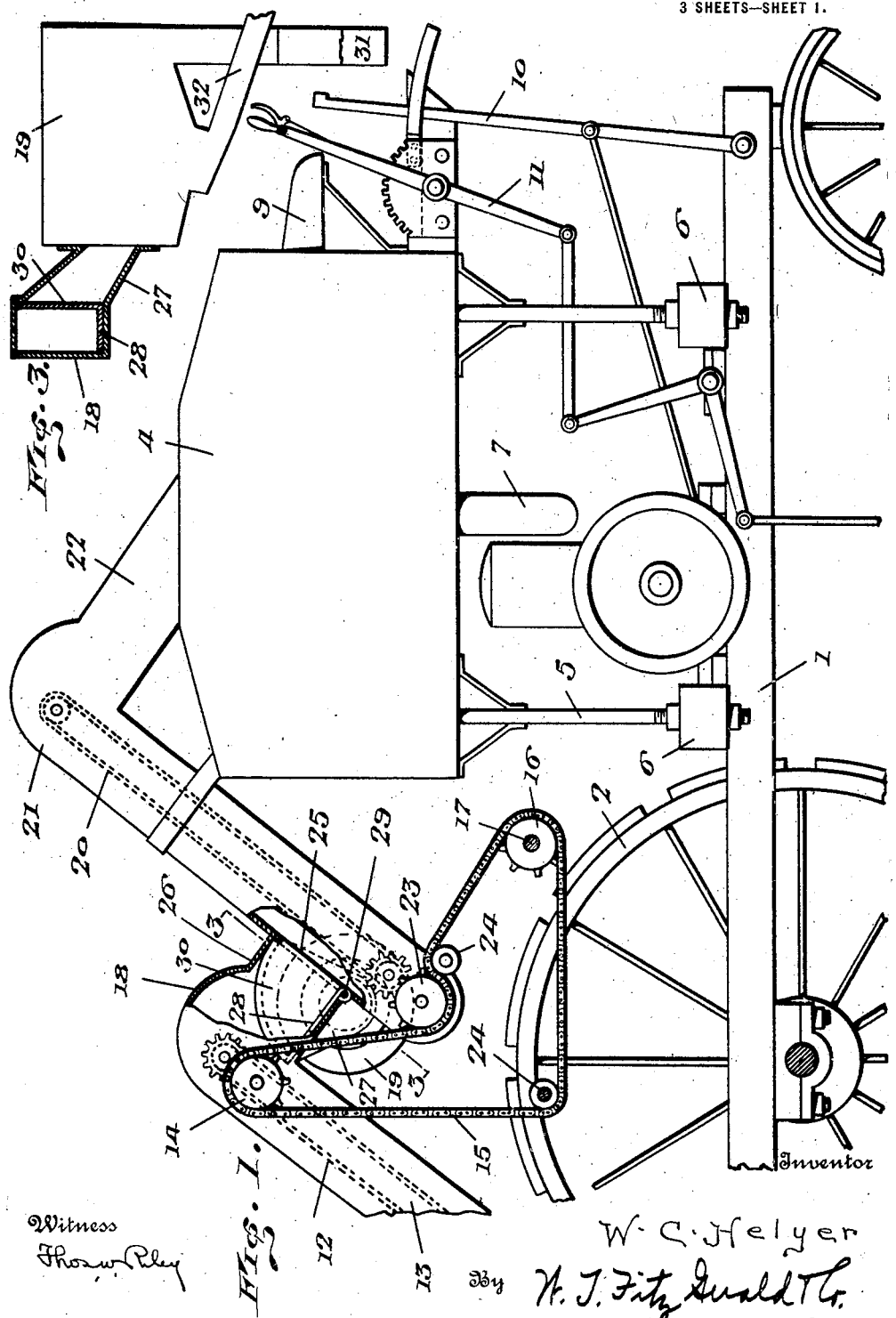

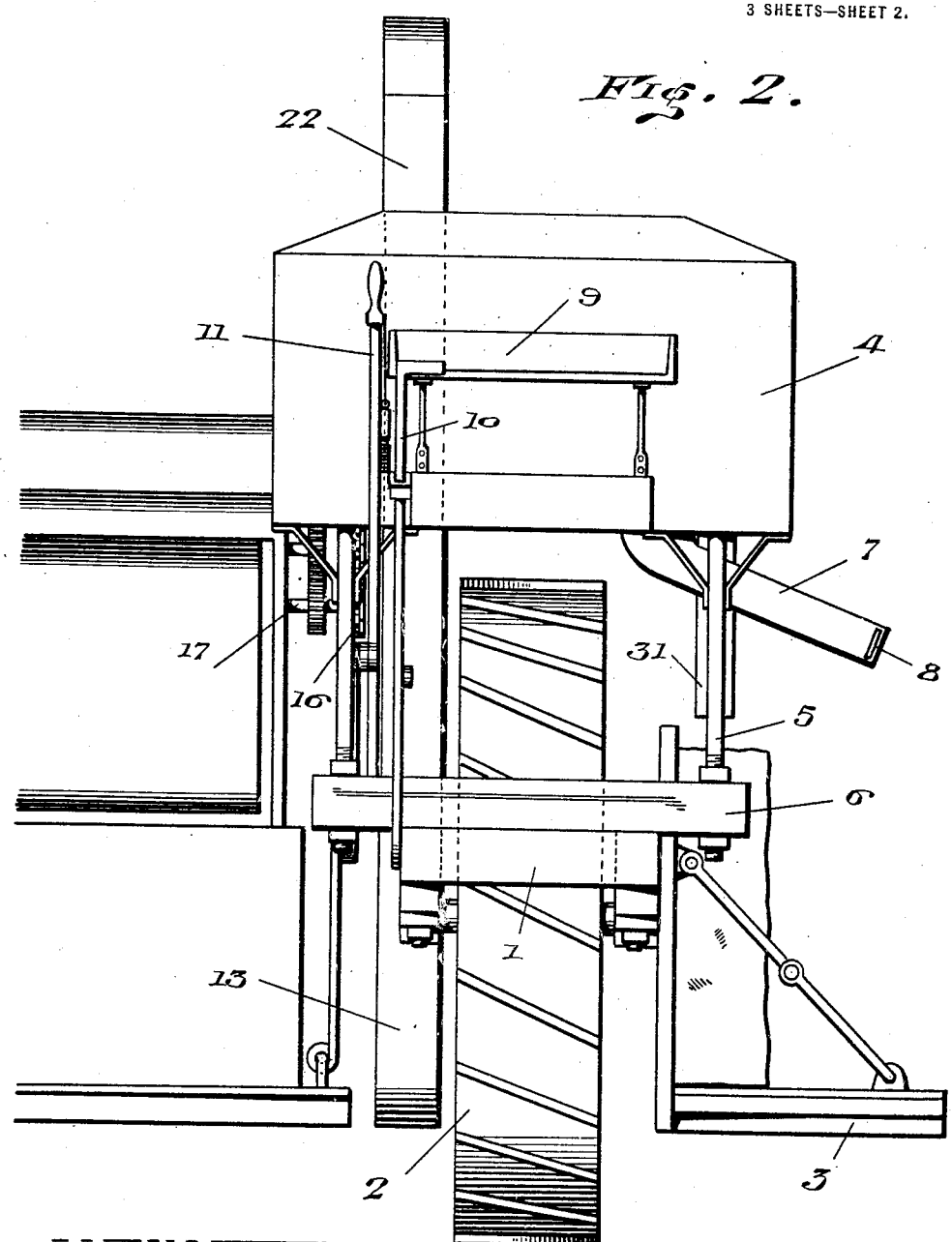

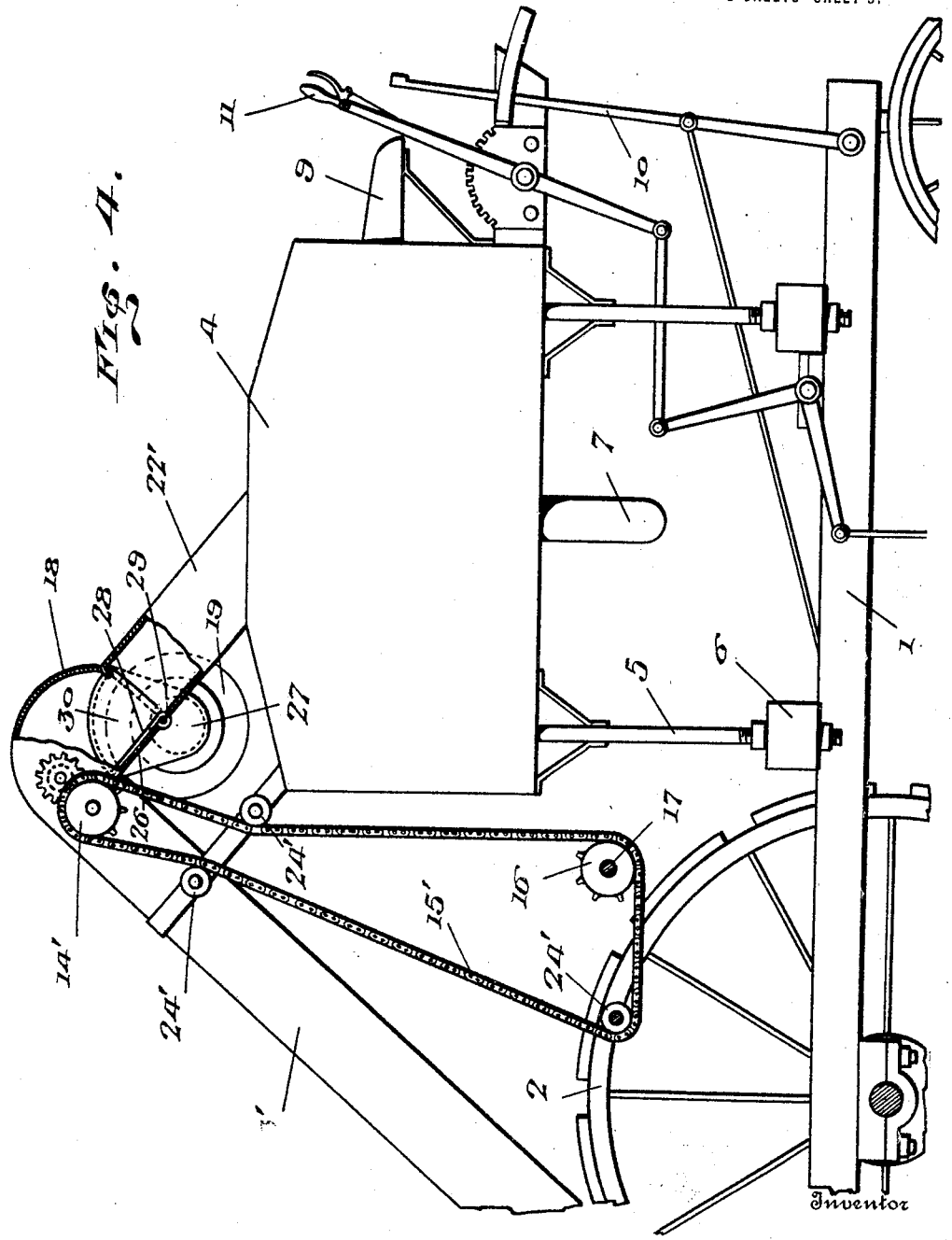

WILBER C. HELYER, OF KENT, OREGON.

GRAIN-HOPPER ATTACHMENT FOR HARVESTERS.

1,376,435.  Specification of Letters Patent. Patented May 3, 1921.

Application filed June 30, 1919. Serial No. 307,806.

*To all whom it may concern:*

Be it known that I, WILBER C. HELYER, a citizen of the United States, residing at Kent, in the county of Sherman and State of Oregon, have invented certain new and useful Improvements in Grain-Hopper Attachments for Harvesters; and I do hereby declare the following to be a full, clear, and exact description of the invention, such as will enable others skilled in the art to which it appertains to make and use the same.

The present invention relates to grain harvesters, and aims to provide means for storing the grain in order that it can be dumped or discharged at intervals into a wagon or other receiver placed at one point of the field, thereby permitting the harvested grain to be accumulated and discharged from time to time as the harvester passes the wagon or receiver, and eliminating the necessity for bagging the grain during the movement of the harvester.

A further object is the provision of such a device having means whereby the grain can be diverted into the ordinary grain cleaner and bagger when the bin or hopper is filled before reaching the wagon or receiver, thereby enabling the device to either deliver the grain into the bin or to the bagger.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein—

Figure 1 is a fragmentary side elevation looking from the inside and showing the present improvements as applied to a grain harvester, portions being broken away and shown in section.

Fig. 2 is a fragmentary front view of the machine showing the improved construction.

Fig. 3 is an enlarged sectional detail taken on the line 3—3 of Fig. 1.

Fig. 4 is a view similar to Fig. 1 illustrating a modification.

The numeral 1 designates the frame of a grain harvester, and 2 the bull wheel, at the outer side of which is supported from the frame a bagging platform 3.

In carrying out the invention, a bin 4 of suitable size is mounted over the frame 1 in advance of bull wheel 2 on posts 5 secured to cross pieces 6 secured on the frame 1 in front of said wheel, and the bin 4 has a hopper bottom with a delivery spout 7 extending outwardly therefrom from under the bin 4 over the platform 3 to discharge the grain into a wagon or other receiver. A cut off valve 8 is provided for the spout 7 to control the discharge of grain therefrom.

The forward end of the bin 4 carries the seat 9 for the driver, providing a convenient position for the driver, and the brake lever 10 and header hand lever 11 are arranged to be operated by the driver.

The reference character 12 indicates the usual grain elevator working within the housing 13, and operated by a sprocket wheel 14 connected by an endless sprocket chain 15 with a sprocket wheel 16 on a shaft 17 of the machine, so that during the operation of the machine, the elevator 12 is operated to carry the grain upward and discharge it from the upper end of the housing 13, which is provided with an overhanging hood 18, from which the grain is ordinarily delivered into a grain cleaner and bagger 19, the use of which is common so that a detailed illustration or description thereof is not necessary. The details of the bagger do not enter into the present invention, as the baggers are already used generally.

With the use of the present invention, there is provided a secondary elevator 20 working within a housing 21 offset in front of the upper end of the housing 13 and extending upward farther and provided at its upper end with a chute 22 for delivering the grain into the bin 4. The secondary elevator elevates the grain sufficiently high so that it can flow into the bin, and the elevator 20 has a sprocket wheel 23 at the lower end of the housing 21 under which the sprocket chain 15 is passed, so that both elevators are operated by said sprocket chain. The sprocket chain extends from the sprocket wheels 14 and 23 past idlers 24 and then down to other sprocket wheels on the machine. The housing 21 has a lateral inlet opening 25 below the hood 18 for receiving the grain from the elevator 12.

In order to divert the grain delivered from the elevator 12 to either the cleaner and bagger 19 or the elevator 20, a short chute 26 is disposed below the hood 18 and at the outer side of the opening 25, and provides a connection between the upper end of the elevator housing 13 and the lower portion of the housing 21, as well as connecting the cleaner and bagger 19 with the housing 13. This chute 26 has one side extended into a spout 27 leading to the cleaner and bagger 19, as seen in Fig. 3, for the flow of grain into said cleaner and bagger, and a valve 28 is provided within the chute 26 for controlling the flow of grain. This valve 28 is hinged, as at 29, at the lower end of the opening 25 to swing to and from said opening over the bottom of the chute 26, and the valve 28 is provided with an upstanding wing 30 at that edge adjacent to the spout 27. Thus, when the valve 28 is swung forwardly to close the opening 25, the grain will be diverted into the spout 27 to pass into the cleaner and bagger 19, and when the valve is swung rearwardly over the chute 26, the grain will drop onto the valve and will be deflected thereby into the housing 21 through the opening 25, the wing 30 preventing the grain from dropping into the spout 26.

In operation, the valve 28 is swung rearwardly to open the opening 25 and cut off the cleaner and bagger 19 from the main elevator 12, so that the grain delivered from the elevator 12 will be directed to the secondary elevator 20 which will raise and deliver it into the bin 4 in which the harvested grain is accumulated and stored. Then, whenever the harvester passes a wagon or receiver positioned at any suitable point of the field, the grain can be discharged from the bin through the spout 7. Should the bin become filled before the harvester reaches the place for emptying the bin, the valve 28 can be swung forwardly to close the opening 25, so that the grain will now be diverted into the cleaner and bagger 19, which permits the excess grain to be bagged until the wagon or receiver is reached.

In the modification shown in Fig. 4, the secondary elevator is eliminated, and the main elevator housing 13' and elevator therein are extended upwardly to a point above the top of the bin 4. In this form, the valve 28' is hinged between the adjacent ends of the chutes 22' and 26 and is swingable to close the passage into the chute 22' or spout 27, whereby the grain can be diverted through the chute 22' or into the cleaner and bagger 19' when the bin 4 is filled.

Having thus described the invention, what is claimed as new is:—

1. In a grain harvester, a grain elevator, a grain storage bin for receiving the elevated grain, an inclined chute leading from the elevator for the passage of the grain to pass to the bin, a spout leading laterally from the bottom and one side of the chute away from said side, and a valve within the chute to be disposed over the spout at the bottom and said side of the chute for directing the grain down the chute and movable to a position to uncover said side and bottom of the chute for the passage of grain laterally into the spout.

2. In a grain harvester, a grain elevator, a grain storage bin for receiving the elevated grain, an inclined chute leading from the elevator for the passage of the grain to pass to the bin, a spout leading laterally from the bottom and outside of the chute away from said side, and a valve hinged within the chute to swing over the bottom thereof over the spout and having a wing to be disposed at said side of the chute for directing the grain down the chute and said valve and its wing being movable to uncover the spout so that the grain passes laterally from the chute into the spout.

In testimony whereof I have signed my name to this specification in the presence of a subscribing witness.

WILBER C. HELYER.

Witness:
W. H. BENNETT.